United States Patent
Tazoe (10) Patent No.: US 8,820,132 B2
(45) Date of Patent: Sep. 2, 2014

(54) METHOD AND FACILITY FOR PRODUCING SEPARATOR FOR USE IN POLYMER ELECTROLYTE FUEL CELL

(75) Inventor: Nobuhiro Tazoe, Tokyo (JP)

(73) Assignee: IHI Corporation, Tokyo (JP)

( * ) Notice: Subject to any disclaimer, the term of this patent is extended or adjusted under 35 U.S.C. 154(b) by 832 days.

(21) Appl. No.: 13/055,544

(22) PCT Filed: Jul. 23, 2009

(86) PCT No.: PCT/JP2009/003462
§ 371 (c)(1),
(2), (4) Date: Jan. 25, 2011

(87) PCT Pub. No.: WO2010/010705
PCT Pub. Date: Jan. 28, 2010

(65) Prior Publication Data
US 2011/0111329 A1    May 12, 2011

(30) Foreign Application Priority Data

Jul. 25, 2008   (JP) ................................ 2008-191803

(51) Int. Cl.
*B21D 13/00* (2006.01)
*H01M 8/02* (2006.01)
*B21D 13/04* (2006.01)
*H01M 8/10* (2006.01)

(52) U.S. Cl.
CPC .......... *H01M 8/0254* (2013.01); *H01M 8/0206* (2013.01); *B21D 13/045* (2013.01); *Y02E 60/50* (2013.01); *H01M 8/1002* (2013.01)
USPC .................... 72/185; 72/129; 72/132; 72/197

(58) Field of Classification Search
USPC ........... 72/129, 132, 183, 185, 197, 205, 240, 72/241.6, 241.8, 245, 248
See application file for complete search history.

(56) References Cited

U.S. PATENT DOCUMENTS 2,575,590 A * 11/1951 Goulding, Jr. ................ 425/151
4,627,258 A * 12/1986 Loges et al. .................... 72/196

(Continued)

FOREIGN PATENT DOCUMENTS

| GB | 1 456 530 | 11/1976 |
|----|-----------|---------|
| JP | 01 321024 | 12/1989 |

(Continued)

OTHER PUBLICATIONS

Extended European Search Report issued Dec. 14, 2012 in Patent Application No. 09800221.5.

(Continued)

*Primary Examiner* — Edward Tolan
(74) *Attorney, Agent, or Firm* — Oblon, Spivak, McClelland, Maier & Neustadt, L.L.P.

(57) ABSTRACT

A material to be formed, which is uncoiled by an uncoiler from a coil while controlled against meandering, is adjusted in inclination angle by an approach angle adjuster and guided into a separator-forming mill. The material to be formed is introduced and pressurized between rolls in the mill so as to continuously form a separator. The separator formed by the mill is discharged and tension controlled by a pinch roll device with opposite widthwise ends of the separator being pinched. The separator discharged by the pinch roll device is cut without stopping the same by a flying shear at portions with no passages formed.

7 Claims, 9 Drawing Sheets

(56) References Cited

U.S. PATENT DOCUMENTS

| | | | |
|---|---|---|---|
| 4,699,050 A * | 10/1987 | Heise | 100/168 |
| 5,979,050 A * | 11/1999 | Counterman et al. | 29/890.034 |
| 6,490,778 B1 | 12/2002 | Funatsu et al. | |
| 6,833,214 B2 | 12/2004 | Funatsu et al. | |
| 7,310,982 B2 * | 12/2007 | Ogawa et al. | 72/10.4 |
| 7,334,446 B1 * | 2/2008 | Bauder | 72/197 |
| 2003/0029214 A1 * | 2/2003 | Steudle et al. | 72/183 |
| 2006/0022301 A1 | 2/2006 | Sofue et al. | |

FOREIGN PATENT DOCUMENTS

| | | |
|---|---|---|
| JP | 01 321025 | 12/1989 |
| JP | 2000 113897 | 4/2000 |
| JP | 2002 190305 | 7/2002 |
| JP | 2002 313354 | 10/2002 |
| JP | 2004 090078 | 3/2004 |
| JP | 2004 119235 | 4/2004 |
| JP | 2004 134090 | 4/2004 |
| JP | 2004 139861 | 5/2004 |
| JP | 2004 220908 | 8/2004 |
| JP | 2005 078981 | 3/2005 |
| JP | 2005 193243 | 7/2005 |
| JP | 2006 185667 | 7/2006 |

OTHER PUBLICATIONS

International Search Report issued Oct. 27, 2009 in PCT/JP09/003462 filed Jul. 23, 2009.

U.S. Appl. No. 13/501,760, filed Apr. 13, 2012, Tazoe.

* cited by examiner

METHOD AND FACILITY FOR PRODUCING SEPARATOR FOR USE IN POLYMER ELECTROLYTE FUEL CELL

TECHNICAL FIELD

The present invention relates to a method and a facility for producing a separator for use in a polymer electrolyte fuel cell.

BACKGROUND ART

Generally, a polymer electrolyte fuel cell uses as fuel pure hydrogen or a hydrogen gas acquired by reforming alcohols, and generates electricity by electrochemically controlling a reaction of the hydrogen with oxygen in the air.

The polymer electrolyte fuel cell, which uses a solid, organic, hydrogen ion permselective membrane as an electrolyte, can be compactified as compared to conventional alkaline, phosphoric acid, molten carbonate, solid oxide or other fuel cells using an aqueous or fused salt electrolyte or other fluid medium as an electrolyte, and is under development for electric vehicles and other applications.

Figure 1:
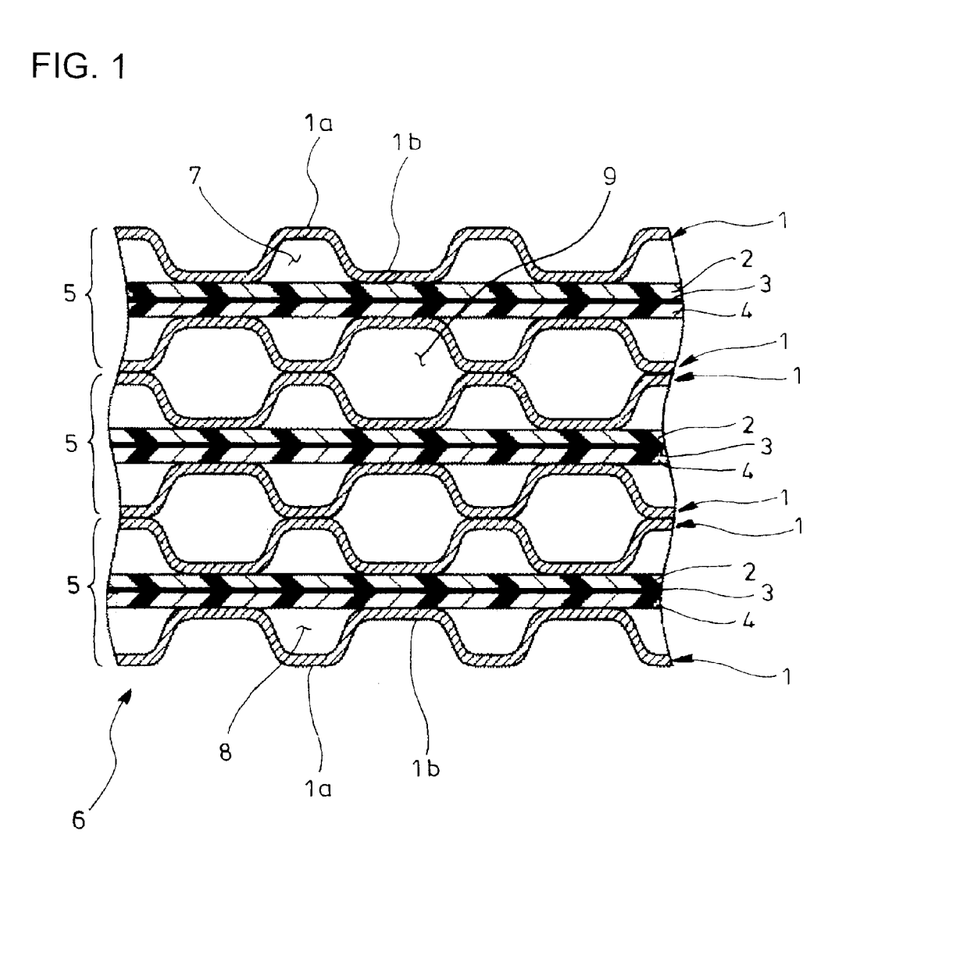
FIG. 1 is an enlarged sectional view of an example of a polymer electrolyte fuel cell.

The polymer electrolyte fuel cell used, as shown in FIG. 1, has cells 5 each of which is of a sandwich structure provided by overlapping a separator 1 with formed convexes and concaves 1a and 1b, a hydrogen electrode 2, a polyelectrolyte membrane 3, an air (oxygen) electrode 4 and a separator 1 with formed convexes and concaves 1a and 1b. A number of cells 5 are stacked into a stack 6 to provide a hydrogen passage 7 defined by the separator 1 and the hydrogen electrode 2 in contact therewith, an air (oxygen) passage 8 defined by the separator 1 and the air electrode 4 in contact therewith and a cooling water passage 9 defined by the overlapped separators 1.

It is conventionally assumed that the separator 1 has a flat margin and a central bulge with a number of convexes and concaves 1a and 1b formed by press forming. However, actually attempted processing of a material made of sheet metal to be formed reveals that the press forming into the shape described above has difficulty since ductile fracture may occur in the bulge with the convexes and concaves 1a and 1b. Moreover, attempt of mass producing the separators 1 by press forming will problematically reduce the production efficiency.

In order to overcome the problems, it is recently proposed to oppositely arrange a pair of rolls having surfaces with forming areas with created convexes and concaves and to introduce and pressurize a material made of sheet metal to be formed between the rolls, thereby continuously producing a separator 1 with passages (hydrogen, air and cooling water passages 7, 8 and 9) formed correspondingly to the concaves and convexes of the rolls.

A state-of-the-art technology of an apparatus for producing a separator 1 for use in a polymer electrolyte fuel cell as shown in FIG. 1 is disclosed, for example, in Patent Literature 1.

CITATION LIST

Patent Literature

Patent Literature 1: JP 2002-190305A

SUMMARY OF INVENTION

Technical Problems

However, it has been still demanded to form a material made of stainless steel or other sheet metal to be formed more and more thinly (to a thickness of 0.1 mm or so) and accurately for the separator 1, and therefore an urgent need is to develop a method and a facility for producing the same.

The invention was made in view of the above and has its object to provide a method and a facility for producing a separator for use in a polymer electrolyte fuel cell capable of accurately forming a material made of sheet metal to be formed without deteriorated production efficiency and efficiently producing a highly accurate separator.

Solution to Problems

The invention is directed to a method for producing a separator for use in a polymer electrolyte fuel cell, which comprises adjusting and guiding a material to be formed, which is uncoiled by an uncoiler from a coil while controlled against meandering, in inclination angle by an approach angle adjuster into a separator-forming mill, introducing and pressurizing said material to be formed between a pair of rolls in said separator-forming mill, said rolls being vertically oppositely arranged to each other and each having circumferentially alternately a forming area with concaves and convexes created on a surface and a non-forming area with no concaves and convexes to continuously form a separator having passages created correspondingly to said concaves and said convexes, discharging and tension controlling the separator formed by said separator-forming mill by a pinch roll device with opposite widthwise ends of the separator being pinched, and cutting the separator discharged by the pinch roll device without stopping the same by a flying shear at portions with no passages formed.

The invention is also directed to a facility for producing a separator for use in a polymer electrolyte fuel cell, comprising an uncoiler capable of uncoiling a coil of a material to be formed while controlling the same against meandering, an approach angle adjuster capable of adjusting in inclination angle the material uncoiled from the coil by said uncoiler, a separator-forming mill with a pair of rolls vertically oppositely arranged to each other and each having circumferentially alternately a forming area with concaves and convexes created on a surface and a non-forming area with no concaves and convexes, the material adjusted in inclination angle by said approach angle adjuster being introduced and pressurized between said rolls for continuous formation of the separator having passages created correspondingly to said concaves and said convexes, a pinch roll device capable of discharging and tension controlling the separator formed by said separator-forming mill with opposite widthwise ends of the separator being pinched, and a flying shear for cutting the separator discharged by said pinch roll device at portions with no passages formed without stopping the same.

According to the above-mentioned means, the following effects are acquired.

The material which is uncoiled from the coil by the uncoiler while controlled against meandering is adjusted in inclination angle by the approach angle adjuster and guided to the separator-forming mill; the material is introduced and pressurized between the paired rolls in the separator-forming mill, which are vertically oppositely arranged to each other and each of which has circumferentially alternately forming area with the concaves and convexes created on the surface and the non-forming area with no concaves and convexes, to continuously form the separator having passages created correspondingly to the concaves and the convexes; the separator formed by the separator-forming mill is discharged and tension controlled by the pinch roll device with opposite widthwise ends of the separator being pinched; the separator discharged by the pinch roll device is cut, without stopping the same, by the flying shear at portions with no passages formed. Thus, the material made of extremely thin sheet metal is reliably formed and cut to enable efficient producing of the separators satisfying a requested accuracy.

In the facility for producing the separator for use in a polymer electrolyte fuel cell, it is preferable that edge conveying guide rollers which support opposite widthwise ends of the separator are arranged on an exit side of the separator-forming mill for stable conveying of the separator having the passages corresponding to the concaves and the convexes.

In the facility for producing the separator for use in a polymer electrolyte fuel cell, said separator-forming mill may include push-up cylinders capable of adjusting a gap between said rolls, full-time play eliminating cylinders arranged between a housing and main bearing axle boxes for said rolls to eliminate plays in the vertical and horizontal directions, auxiliary bearings fitted to necks of said rolls, non-forming-time play eliminating cylinders arranged between said auxiliary bearings to eliminate a play between said rolls and said main bearings, load sensors for sensing forming loads, and a controller which outputs operational signals to said push-up cylinders, said full-time play eliminating cylinders and said non-forming-time play eliminating cylinders, respectively, on the basis of the forming loads sensed by the load sensors to repeatedly perform the elimination of the play between the rolls and the main bearings in the non-forming area and the forming of the material in the forming area while the play between the housing and the main bearing axle boxes for the rolls is always eliminated. Thus, with the play between the housing and the main bearing axle boxes for the rolls in the separator-forming mill being eliminated by the operation of the full-time play eliminating cylinders and the play between the rolls and the main bearings being eliminated by the operation of the non-forming-time play eliminating cylinders, the gap between the rolls can be accurately retained at the setting value and, even if the material is made of extremely thin sheet metal, the accuracy required for the forming is acquired to enable the efficient producing of the separator.

In the facility for producing the separator for use in a polymer electrolyte fuel cell, it is preferable that roll shafts of the rolls are directly coupled to separate servo motors through reduction gears including their respective strain wave gearing mechanisms and the reduction gears are directly coupled to the corresponding main bearing axle boxes for transmitting a rotative force to the rolls with a play of a rotative power transmission system minimized in the rotational direction.

Advantageous Effects of Invention

A method and a facility for producing a separator for use in a polymer electrolyte fuel cell of the invention can achieve excellent effects that a material made of sheet metal to be formed can be accurately formed without deteriorated production efficiency and a highly accurate separator can be efficiently produced.

DESCRIPTION OF EMBODIMENT

An embodiment of the invention will be described with reference to the accompanying drawings.

Figure 2:
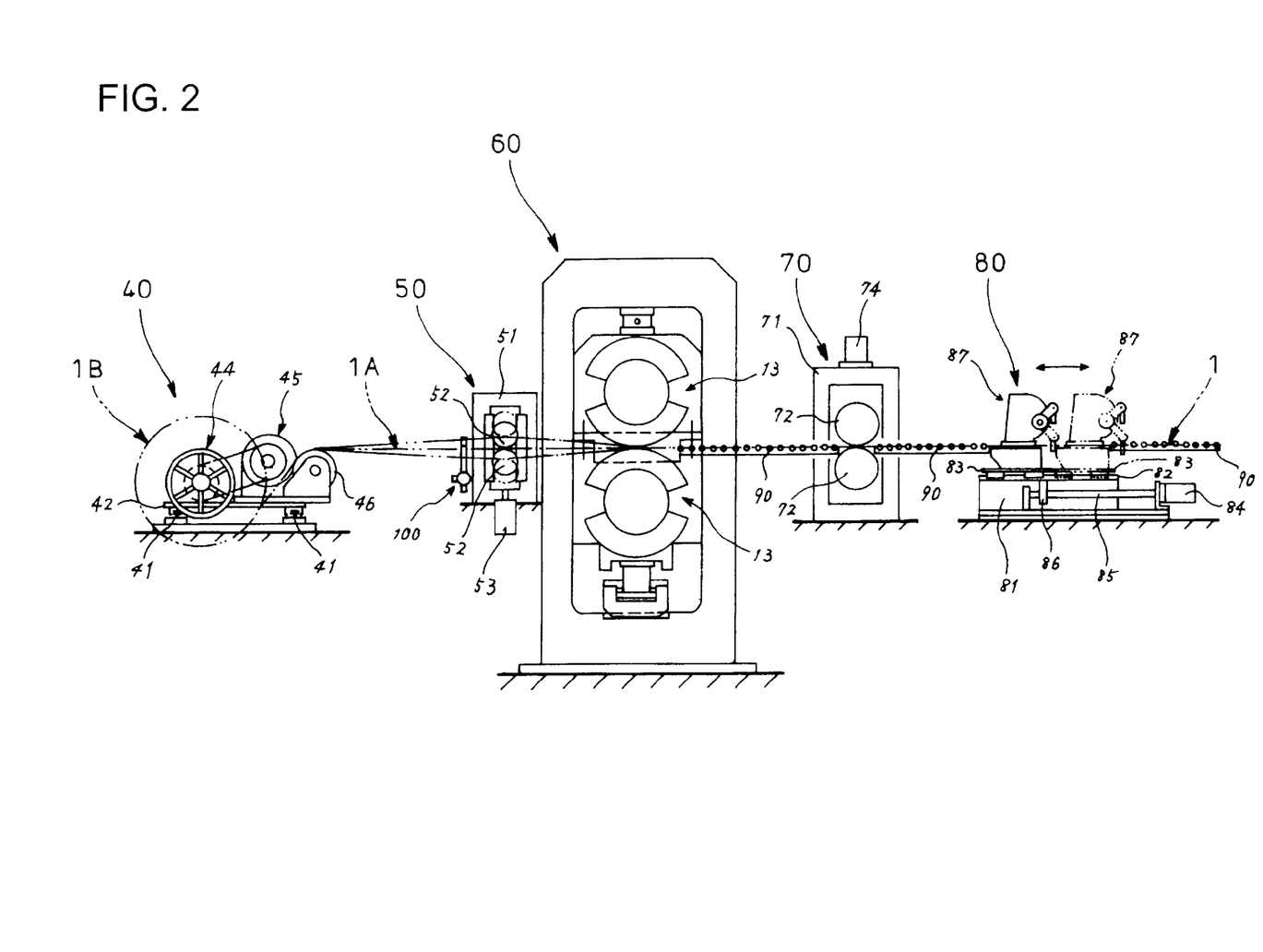
FIG. 2 is a schematic of an overall configuration of an embodiment of the invention.
Figure 3:
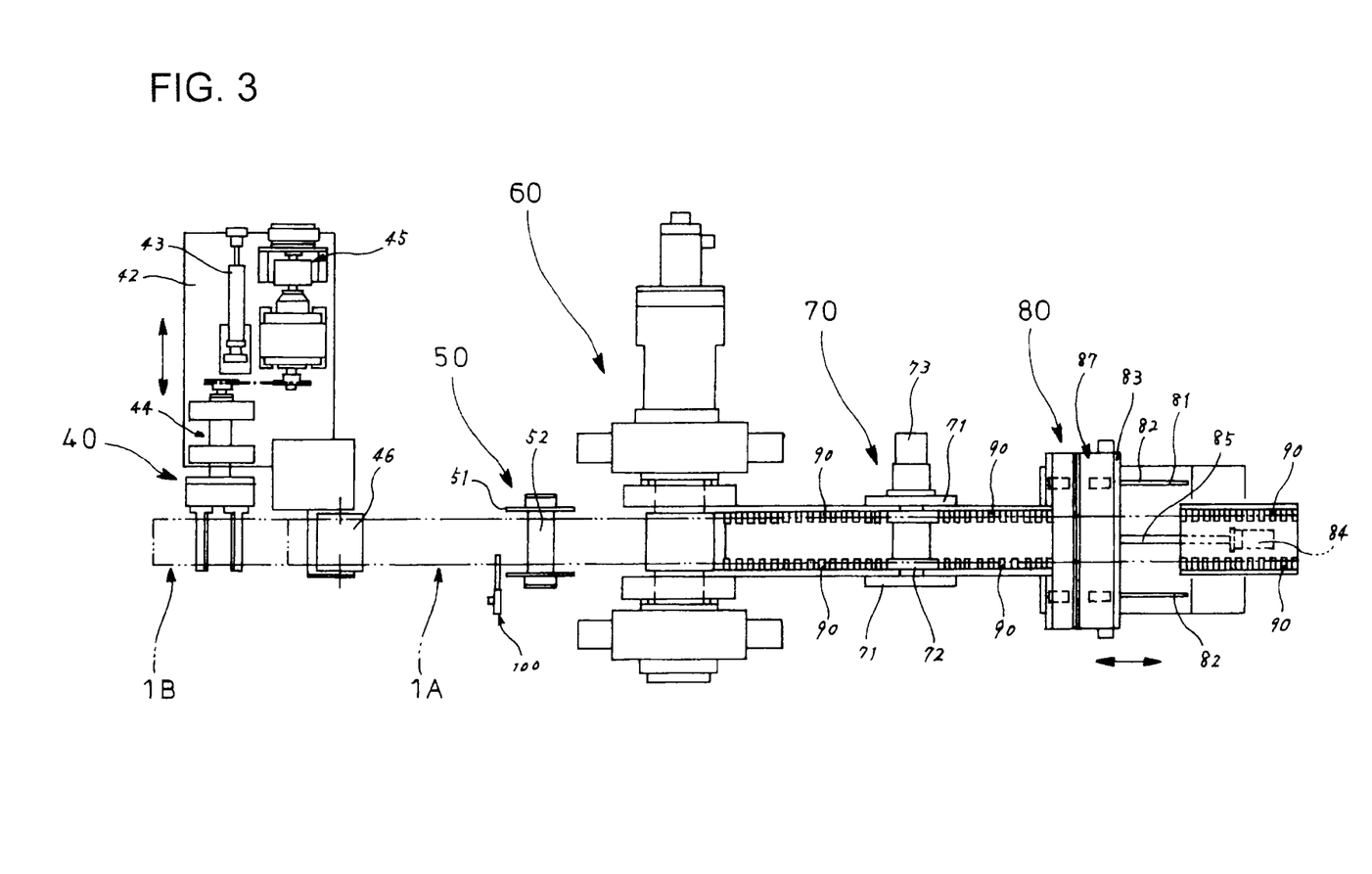
FIG. 3 is an overall plan view of the embodiment of the invention.

FIGS. 2 and 3 show the embodiment of the invention comprising an uncoiler 40 capable of uncoiling a coil 1B of a material 1A to be formed while controlling the same against meandering, an approach angle adjuster 50 capable of adjusting in inclination angle the material 1A uncoiled from the coil 1B by the uncoiler 40, a separator-forming mill 60 which continuously forms a separator 1 (see FIG. 1) with formed passages (hydrogen, air and cooling water passages 7, 8 and 9) by introducing and pressurizing the material 1A adjusted in inclination angle by the adjuster 50 between a pair of rolls 13 described hereinafter, a pinch roll device 70 capable of discharging and tension controlling the separator 1 formed by the mill 60 with opposite widthwise ends of the separator being pinched, and a flying shear 80 which cuts the separator 1 discharged by the pinch roll device 70 at portions with no passage formed without stopping the separator, thus providing a facility for producing a separator for use in a polymer electrolyte fuel cell.

In this embodiment, arranged on an exit side of the separator-forming mill 60 are edge conveying guide rollers 90 which support opposite widthwise ends of the separator 1.

The uncoiler 40 is constructed, as shown in FIGS. 2 and 3, such that guide rails 41 are laid down to extend horizontally and perpendicular to a travel direction of the material 1A and a base plate 42 is arranged on and slidably along the rails by telescopic operation of a slide actuator 43. Arranged on the base plate 42 are an uncoiler body 44 which uncoils the coil 1B, a brake device 45 which controls torque of the uncoiler body 44 during uncoiling of the material 1A and an uncoiling guide roller 46 which discharges the material 1A uncoiled from the coil 1B in the uncoiler body 44. Control of the material 1A against the meandering is performed by operating the slide actuator 43 for the horizontal sliding of the base plate 42 perpendicular to the travel direction of the material 1A; and tension control of the material 1A is performed by operating the brake device 45 for torque control of the uncoiler body 44 during uncoiling of the material 1A.

The approach angle adjuster 50 is constructed, as shown in FIGS. 2 and 3, by a pair of vertically oppositely arranged adjusting rolls 52 which are rotatably supported by a housing 51 and are vertically movable by operating an elevating actuator 53. The inclination angle of the material 1A is adjustable by vertically moving the adjusting rolls 52 with the material 1A being introduced therebetween.

The pinch roll device 70 is constructed, as shown in FIGS. 2 and 3, by a pair of vertically oppositely arranged pinch rolls 72 each having opposite widthwise ends with a diameter greater than that of a middle portion of the pinch roll. The pinch rolls are supported by a pinch housing 71 such that their rotational speed is adjustable by operating a servo motor 73 and their pinching pressure is adjustable by operating a pressurizing cylinder 74. The separator 1 formed by the separator-forming mill 60 is discharged and tension controlled by the pinch roll device with opposite widthwise ends of the separator being pinched by the pinch rolls 72.

The flying shear 80 is constructed, as shown in FIGS. 2 and 3, such that guide rails 82 are laid down on a fixed pedestal 81 to extend in the travel direction of the separator 1, and a moving table 83 with a shear body 87 arranged thereon is slidable along the guide rails 82 by moving a nut 86 through rotary drive of a ball screw 85 by a servo motor 84. Thus, the separator 1 discharged by the pinch roll device 70 is adapted to be cut with the shear body 87 without stopping the separator by sliding and operating the shear body 87 in synchronism with the travel speed of the separator 1.

Arranged on an entry side of the approach angle adjuster 50 is a noncontact photosensor 100 which senses the inclination angle and any meandering of the material 1A to be formed.

Figure 4:
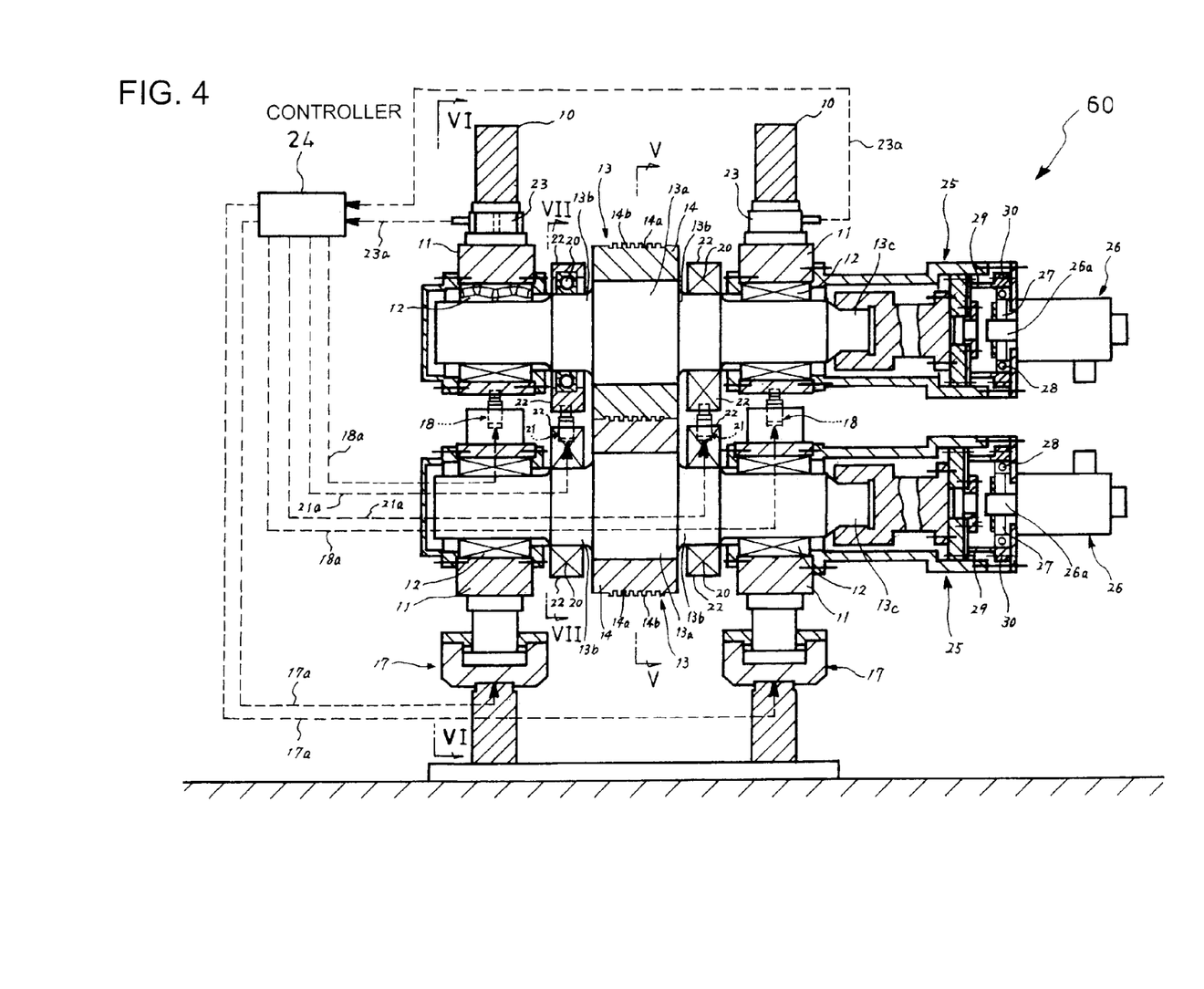
FIG. 4 is a sectional side view of a separator-forming mill in the embodiment of the invention.
Figure 5:
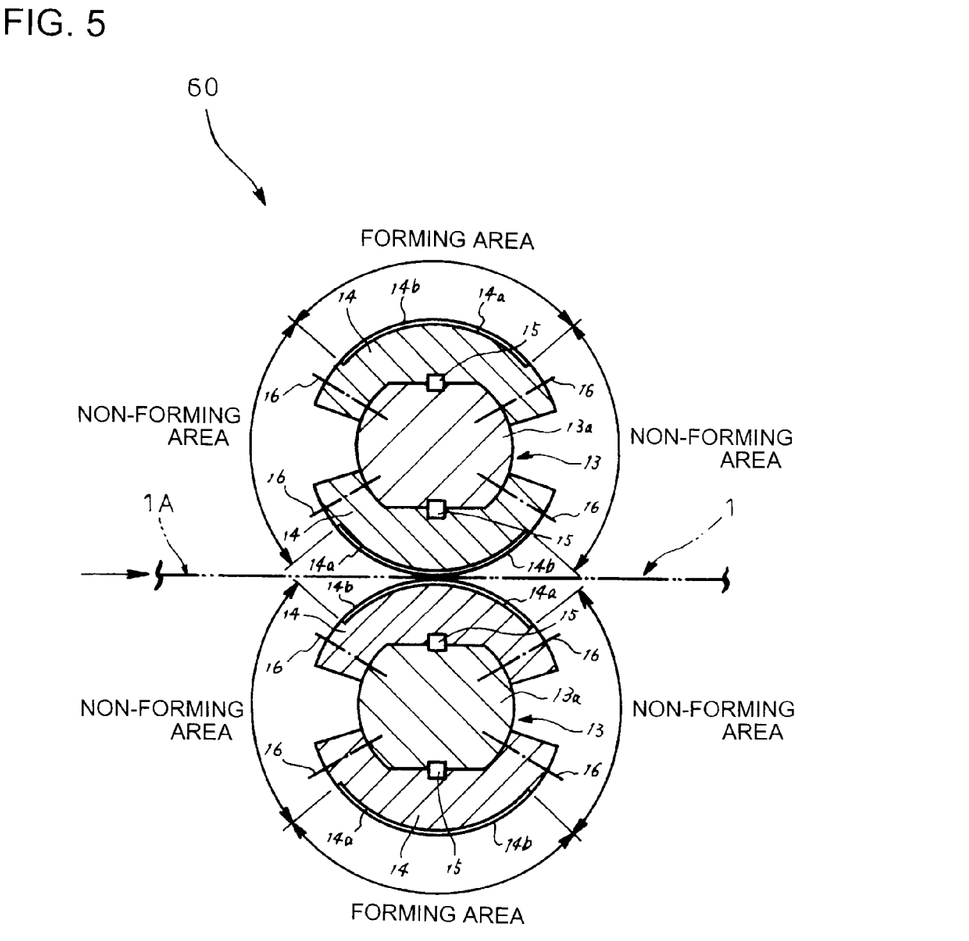
FIG. 5 is a sectional view of rolls of the separator-forming mill in the embodiment of the invention, corresponding to a sectional view taken along V-V in FIG. 4.
Figure 6:
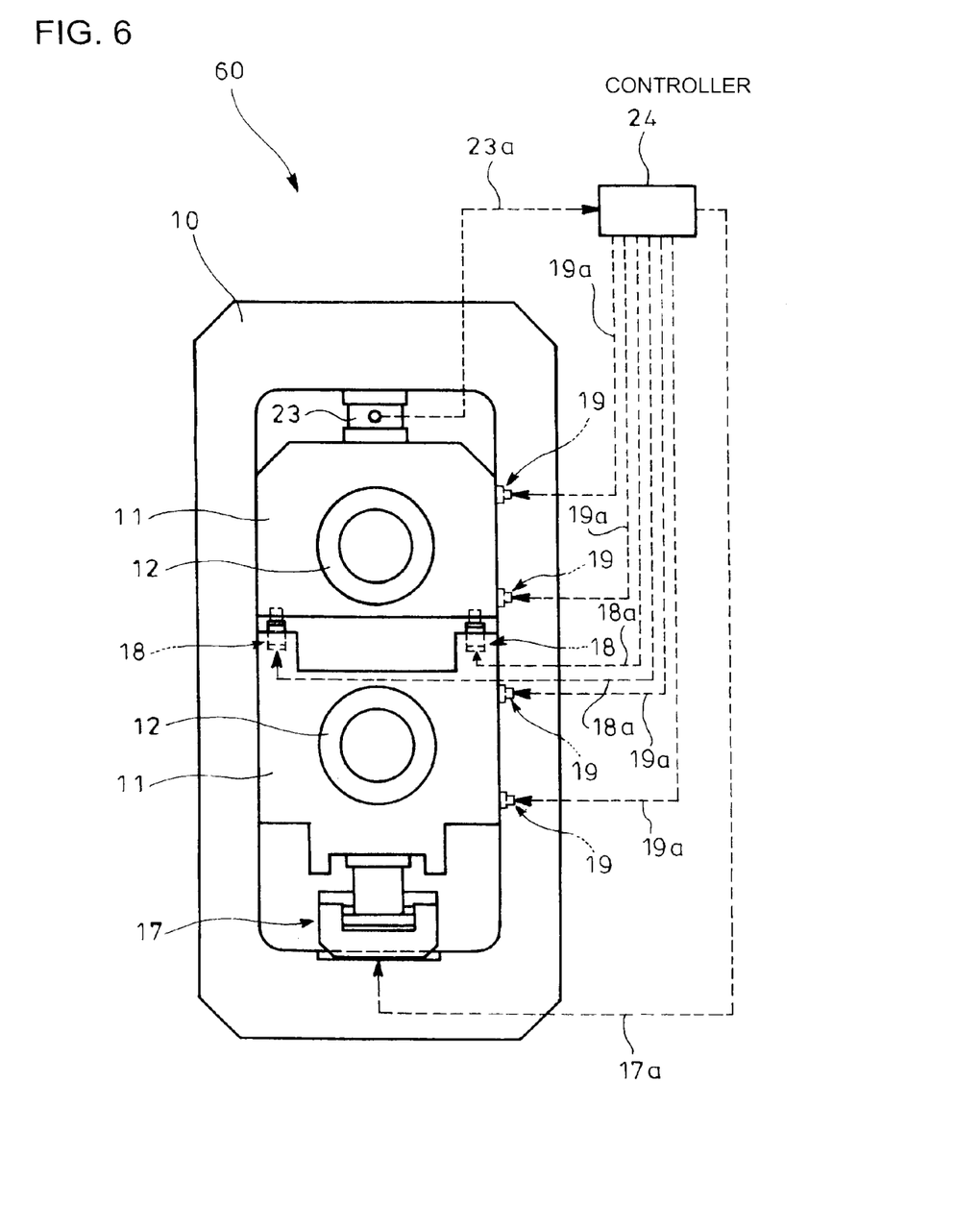
FIG. 6 is a diagram of full-time play eliminating cylinders which eliminate play between the rolls and main bearings in the separator-forming mill in the embodiment of the invention, corresponding to an arrow view taken along VI-VI in FIG. 4.
Figure 7:
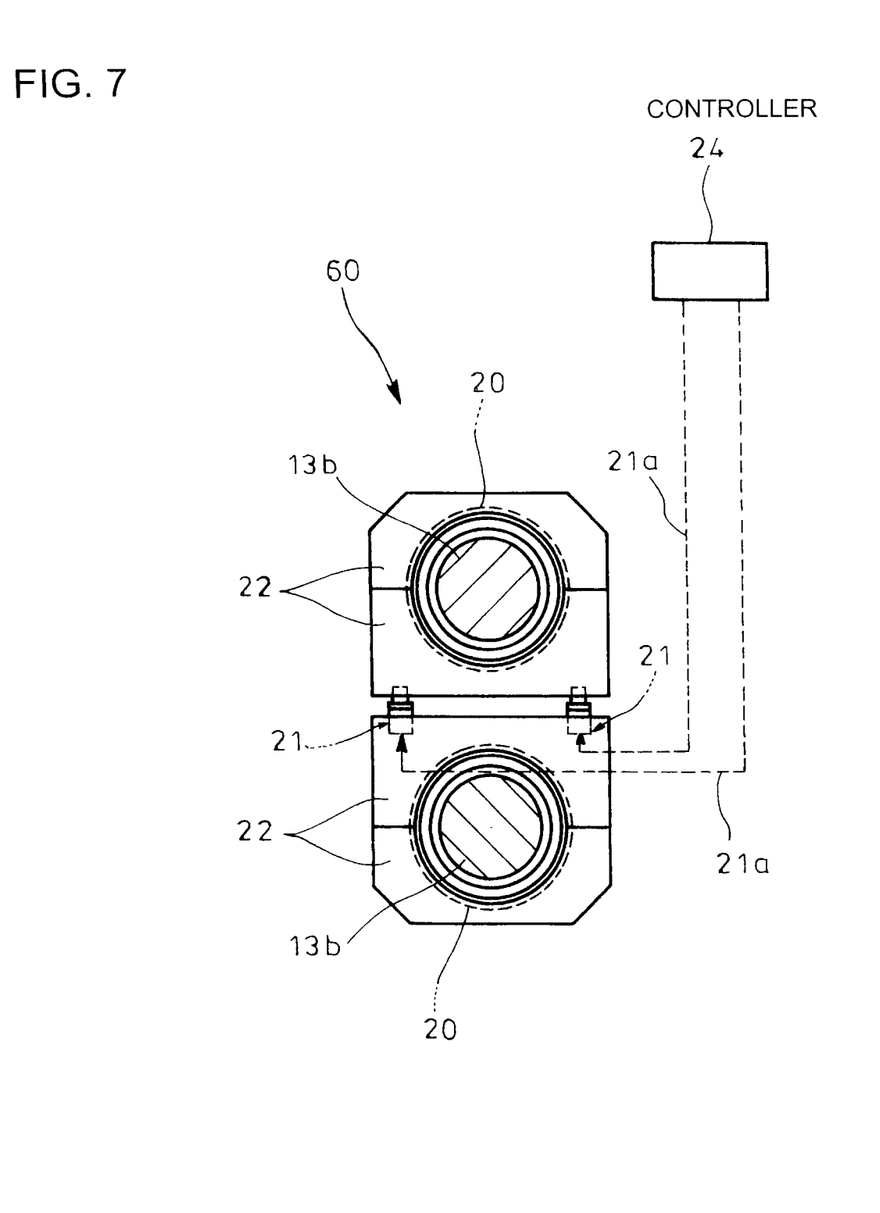
FIG. 7 is a diagram of non-forming-time play eliminating cylinders which eliminate a play between the rolls and the main bearings in the separator-forming mill in the embodiment of the invention as well as auxiliary bearings, corresponding to an arrow view taken along VII-VII in FIG. 4.

FIGS. 4 to 9 are views relating to the separator-forming mill 60 in the embodiment of the invention. Reference numeral 10 denotes a housing; 11, main bearing axle boxes arranged in the housing 10; 12, main bearings arranged in the main bearing axle boxes 11; and 13, a pair of rolls arranged vertically oppositely to each other and rotatably supported by the main bearings 12 to the housing 10. As shown in FIGS. 4 and 5, the roll 13 has circumferentially alternately a forming area with concaves 14a and convexes 14b created on a surface and a non-forming area with no concaves 14a and convexes 14b.

In the embodiment, the forming and non-forming areas are circumferentially alternately formed on the roll 13 by fitting two arc-shaped dies 14 each having the forming area with the concaves 14a and the convexes 14b created on the surface onto a roll body 13a of the roll 13 with keys 15 and bolts or other fastening members 16.

Arranged in a lower portion of the housing 10 are push-up cylinders 17 capable of adjusting a gap between the rolls 13 by pushing up and down the main bearing axle boxes 11 of the roll 13 on the lower side. Arranged between the housing 10 and the main bearing axle boxes 11 for the rolls 13 are full-time play eliminating cylinders 18 and 19 (see FIGS. 4 and 6) eliminating plays in vertical and horizontal directions. Fitted to necks 13b of the rolls 13 are auxiliary bearings 20. Arranged between the auxiliary bearings 20 are non-forming time play eliminating cylinders 21 (see FIGS. 4 and 7) eliminating play between the rolls 13 and the main bearings 12. Arranged in an upper portion of the housing 10 are load cells or other load sensors 23 sensing forming loads 23a. A controller 24 is arranged to output operational signals 17a, 18a, 19a and 21a to the push-up cylinders 17, the full-time play eliminating cylinders 18 and 19 and the non-forming-time play eliminating cylinders 21, respectively, on the basis of the forming loads 23a sensed by the load sensors 23.

The non-forming-time play eliminating cylinder 21 is interposed between half-divided auxiliary bearing covers 22 attached to cover the outer circumferences of the auxiliary bearings 20.

Roll shafts 13c of the respective rolls 13 are directly coupled to separate servo motors 26 through reduction gears 25 with their respective strain wave gearing mechanisms, which are so-called harmonic drives (registered trademark), and the reduction gears 25 are directly coupled to the corresponding main bearing axle boxes 11.

Figure 8A:
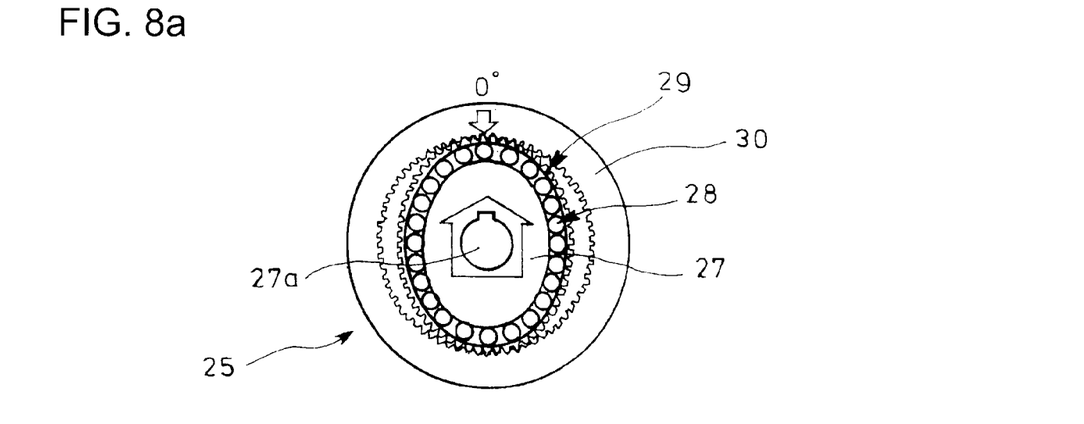
FIG. 8a is an elevation for explaining a principle of a strain wave gearing mechanism of a reduction gear applied to the separator-forming mill of FIG. 4, showing a state before starting rotation of a wave generator.
Figure 8B:
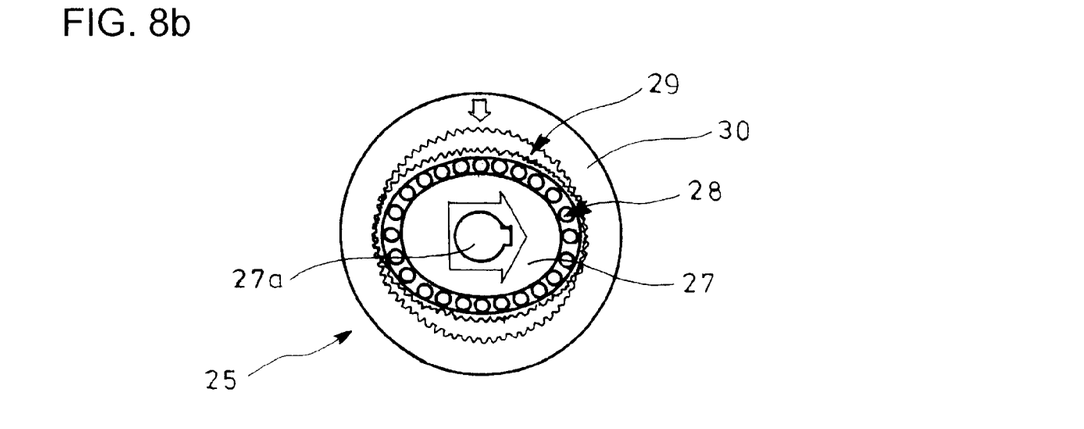
FIG. 8b is an elevation for explaining the principle of the strain wave gearing mechanism of the reduction gear applied to the separator-forming mill of FIG. 4, showing a state when the wave generator is rotated clockwise by 90 degrees.
Figure 8C:
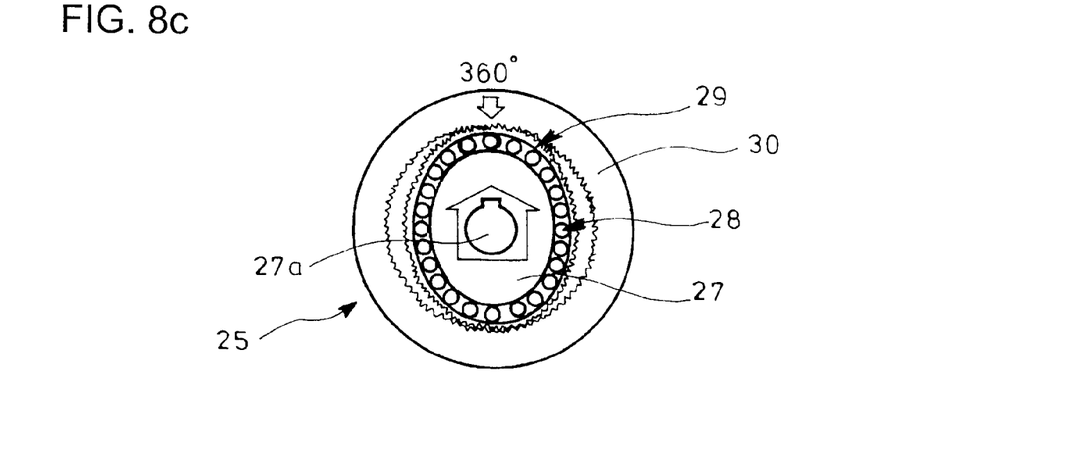
FIG. 8c is an elevation for explaining the principle of the strain wave gearing mechanism of the reduction gear applied to the separator-forming mill of FIG. 4, showing a state when the wave generator is rotated clockwise by 360 degrees.

As shown in FIGS. 8a to 8c, the reduction gear 25 with the strain wave gearing mechanism comprises a wave generator 27 having an elliptical outer circumference, an elastically deformable flexspline 29 having an outer circumference with a number of external teeth and fitted over the wave generator 27 via a bearing 28, circumferentially deflected positions of the flexspline 29 sequentially changing due to rotation of the wave generator 27 as shown in FIGS. 8b and 8c, and a non-rotative circular spline 30 located circumferentially of the flexspline 29 and having internal teeth fitted with the external teeth of the flexspline 29, positions of the internal teeth of the circular spline fitted with the external teeth of the flexspline being changed as the deflected positions of the flexspline 29 change. The wave generator 27 has a shaft hole 27a into which a shaft 26a of the servo motor 26 is fitted (see FIG. 4); and the flexspline 29 is connected with the roll shaft 13c of the roll 13. The number of the external teeth of the flexspline 29 is several fewer than that of the internal teeth of the circular spline 30.

For example, when the wave generator 27 rotates clockwise in FIG. 8a due to the drive of the servo motor 26, the flexspline 29 elastically deforms; the external teeth of the flexspline 29 engage with the internal teeth of the circular spline 30 at long axis portions of the ellipse of the wave generator 27, the external teeth of the flexspline 29 completely departing from the internal teeth of the circularspline 30 at short axis portions of the ellipse of the wave generator 27; as a result, the engaging positions between the external teeth of the flexspline 29 and the internal teeth of the circular spline 30 sequentially move circumferentially (clockwise) (see FIG. 8b); and when the wave generator 27 rotates once, the engaging positions between the external teeth of the flexspline 29 and the internal teeth of the circularspline 30 are moved from the positions at the start of rotation (see FIG. 8c). As a result, the flexspline 29 is located short of the positions at the start of rotation by the number of the external teeth less than the number of the internal teeth of the circularspline 30 (see FIG. 8c) and, therefore, the flexspline 29 is moved in the direction opposite to the rotational direction of the wave generator 27 (in the counterclockwise direction in FIG. 8c), which is picked up as a rotational output by the roll shaft 13c of the roll 13.

Backlash of the reduction gear 25 itself, which directly affects rotational variations of the roll 13, must be minimal. Since the reduction gear 25 with the strain wave gearing mechanism is a reduction gear having extremely minimal backlash as described above, plays of the rotative power system (variation in rotative phase difference) are reduced by the reduction gear 25 to a negligible level in the invention.

Figure 9:
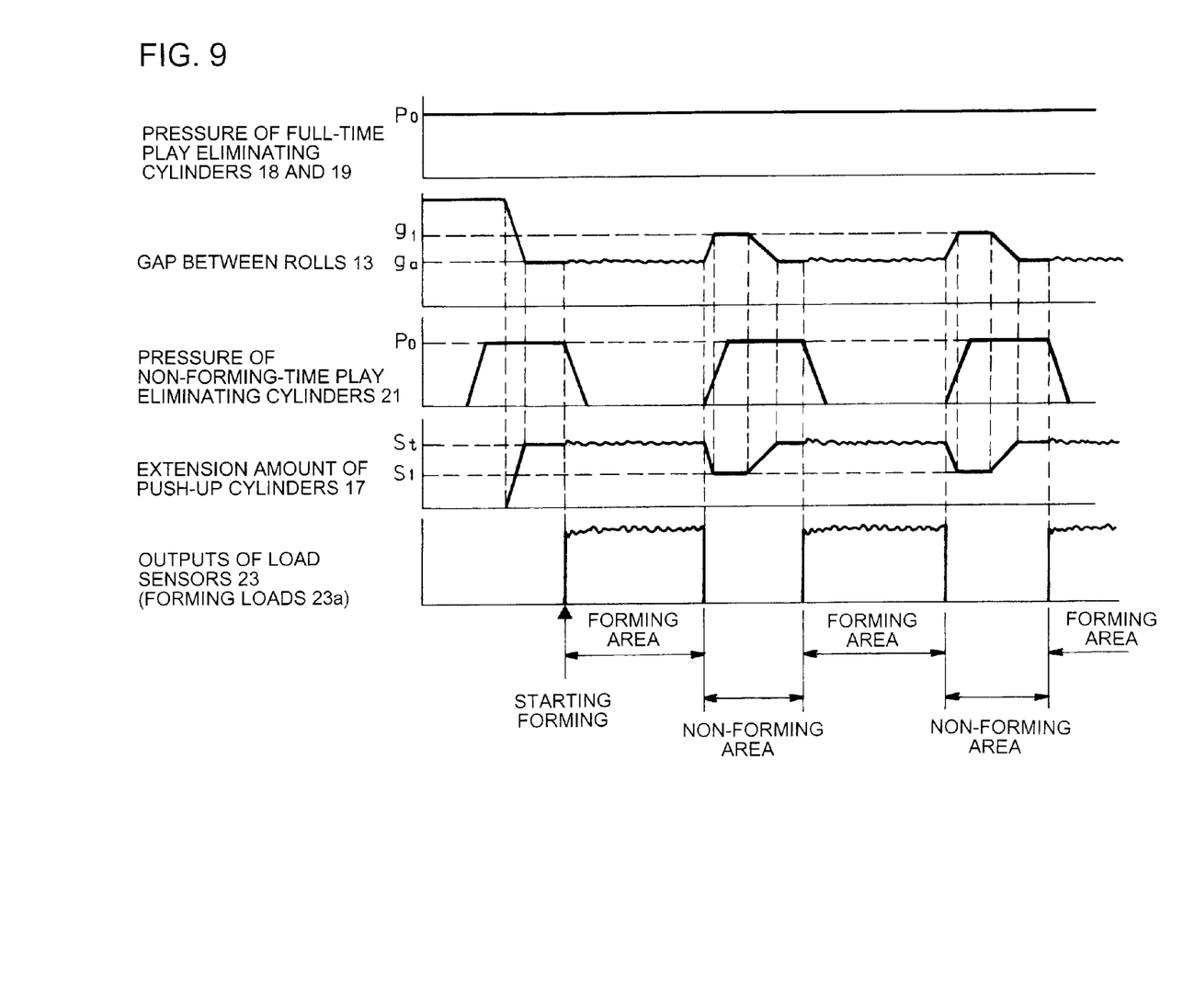
FIG. 9 is a control chart of a relationship among outputs of the load sensors, operational states of full-time, non-forming-time play eliminating and push-up cylinders and a gap between the rolls in the separator-forming mill before starting forming of the material and in forming and non-forming areas in the embodiment of the invention.

Further in the embodiment, as shown in FIG. 9, before starting the forming, the controller 24 outputs the operational signals 18a and 19a which set the setting pressure of the full-time play eliminating cylinders 18 and 19 to $P_0$; with plays in the vertical and horizontal directions being thus eliminated between the housing 10 and the main bearing axle boxes 11 for the rolls 13, the controller 24 outputs the operational signals 17a which retract the push-up cylinders 17 to make a gap between the rolls 13 greater than a setting value $g_a$, and outputs the operational signals 21a which set the setting pressure of the non-forming-time play eliminating cylinders 21 to $P_0$ to eliminate plays between the rolls 13 and the main bearings 12; in this state, the controller 24 outputs the operational signals 17a which set the extension amount of the push-up cylinders 17 to $S_t$ to set the gap between the rolls 13 to the setting value $g_a$. When the material 1A made of sheet metal to be formed (see FIG. 5) is introduced between the rolls 13 and the forming loads 23a are generated and sensed by the load sensors 23, it is determined that the material 1A enters into the forming area and the controller 24 outputs the operational signals 21a which change the setting pressures of the non-forming-time play eliminating cylinders 21 from $P_0$ to 0 to cause the forming of the material 1A. When the forming loads 23a turn to zero, it is determined that the material 1A enters into the non-forming area and the controller 24 outputs the operational signals 17a which retract the push-up cylinders 17 to change the extension amount from $S_t$ to $S_1$ to increase the gap between the rolls 13 into $g_1$ which is greater than the setting value $g_a$, and outputs the operational signals 21a which set the setting pressure of the non-forming-time play eliminating cylinders 21 to $P_0$ to eliminate the play between the rolls 13 and the main bearings 12; the controller 24 outputs the operational signals 17a which increase the extension amount of the push-up cylinders 17 from $S_1$ to $S_t$ again to set the gap between the rolls 13 to the setting value $g_a$. When the forming loads 23a are generated, it is determined that the material 1A enters into the forming area and the controller 24 outputs the operational signals 21a which change the setting pressure of the non-forming-time play eliminating cylinders 21 from $P_0$ to 0 to cause the forming of the material 1A. Subsequently, the elimination of the play between the rolls 13 and the main bearings 12 in the non-forming area and the forming of the material 1A in the forming area are repeatedly performed while the plays between the housing 10 and the main bearing axle boxes 11 for the rolls 13 are always eliminated.

An operation of the embodiment will be described.

As shown in FIGS. 2 and 3, the material 1A uncoiled from the coil 1B by the uncoiler 40 while controlled against meandering is adjusted in inclination angle by the approach angle adjuster 50 and guided to the separator-forming mill 60. The material 1A is introduced and pressurized between vertically oppositely arranged, paired rolls 13 in the separator-forming mill 60 having circumferentially alternately the forming area with the concaves 14a and the convexes 14b created on the surface and the non-forming area with no concaves 14a and convexes 14b to continuously form the separator 1 (see FIG. 1) having passages (the hydrogen, air and cooling water passages 7, 8 and 9) created correspondingly to the concaves 14a and the convexes 14b. The separator 1 formed by the separator-forming mill 60 is discharged and tension controlled by the pinch roll device 70 with opposite widthwise ends of the separator being pinched. The separator 1 discharged by the pinch roll device 70 is cut without stopping the same by the flying shear 80 at portions with no passage formed. Thus, the material made of extremely thin sheet metal is reliably formed and cut to enable efficient production of the separators 1 satisfying a requested accuracy.

In the facility for producing the separator for use in a polymer electrolyte fuel cell shown in FIGS. 2 and 3, the edge conveying guide rollers 90 supporting the opposite widthwise ends of the separator 1 are arranged on the exit side of the separator-forming mill 60, so that the separator 1 can be stably conveyed.

Next, an operation of the separator-forming mill 60 will be described hereinafter in detail.

First, in a preparatory stage before starting the forming, the controller 24 outputs the operational signals 18a, 19a which set the setting pressure of the full-time play eliminating cylinders 18 and 19 to $P_0$; with the plays in the vertical and horizontal directions being thus eliminated between the housing 10 and the main bearing axle boxes 11 for the rolls, the controller 24 outputs the operational signals 17a which retract the push-up cylinder 17 to retain the gap between the rolls 13 greater than the setting value $g_a$, and outputs the operational signals 21a which set the setting pressure of the non-forming-time play eliminating cylinders 21 to $P_0$ to eliminate the plays between the rolls 13 and the main bearings 12; in this state, the controller 24 outputs the operational signals 17a which set the extension amount of the push-up cylinders 17 to $S_t$ to set the gap between the rolls 13 to the setting value $g_a$.

When the material 1A made of sheet metal to be formed (see FIG. 5) is subsequently introduced between the rolls 13 to start the forming, the forming loads 23a sensed by the load sensors 23 jumps up; it is determined at this point that the material 1A enters into the forming area and the controller 24 outputs the operational signals 21a which change the setting pressure of the non-forming-time play eliminating cylinders 21 from $P_0$ to 0 to cause the forming of the material 1A.

When the forming load 23a subsequently turns to zero, it is determined that the material 1A enters into the non-forming area and the controller 24 outputs the operational signals 17a which retract the push-up cylinders 17 to change the extension amount from $S_t$ to $S_1$ to expand the gap between the rolls 13 to $g_1$ which is greater than the setting value $g_a$, and outputs the operational signals 21a which set the setting pressure of the non-forming-time play eliminating cylinders 21 to $P_0$ to eliminate the play between the rolls 13 and the main bearings 12; and the controller 24 outputs the operational signals 17a which increase the extension amount of the push-up cylinders 17 from $S_1$ to $S_t$ again to set the gap between the rolls 13 to the setting value $g_a$.

When the forming load 23a is generated, it is determined that the material 1A enters into the forming area and the controller 24 outputs the operational signals 21a which change the setting pressure of the non-forming-time play eliminating cylinders 21 from $P_0$ to 0 to cause the forming of the material 1A. Subsequently, the elimination of the play between the rolls 13 and the main bearings 12 in the non-forming area and the forming of the material 1A in the forming area are repeatedly performed while the plays between the housing 10 and the main bearing axle boxes 11 for the rolls 13 is always eliminated.

In this way, the play between the housing 10 and the main bearing axle boxes 11 for the rolls 13 is eliminated by the operation of the full-time play eliminating cylinders 18 and 19; the play between the rolls 13 and the main bearings 12 is eliminated by the operation of the non-forming-time play eliminating cylinders 21; and the gap between the rolls 13 can be accurately retained at the setting value $g_a$. As a result, even if the material 1A is made of extremely very thin sheet metal, the accuracy required for the forming is acquired to enable the efficient producing of the separators 1 (see FIG. 1) having passages (the hydrogen, air and cooling water passages 7, 8 and 9) highly accurately created correspondingly to the concaves 14a and the convexes 14b.

Moreover the roll shafts 13c of the rolls 13 are directly coupled to the separate servo motors 26 through the reduction gears 25 including their respective strain wave gearing mechanisms and the reduction gears 25 are directly coupled to the corresponding main bearing axle boxes 11. Thus, when the servo motors 26 are driven, the rotative powers of the servo motors 26 are transmitted through the shafts 26a to the reduction gears 25 including the strain wave gearing mechanisms, decelerated and transmitted to the roll shafts 13c of the rolls 13 and, as a result, the rolls 13 are independently rotated. Since the servo motors 26 have a lower value of speed variance of the order of ±0.01% and therefore have reduced vibrations and since the shafts 26a of the servo motors 26 are directly coupled to the reduction gears 25 including the strain wave gearing mechanisms and no play is generated by, for example, a backlash of a gear or a clearance of a joint, rotative forces with reduced vibration can be transmitted to the reduction gears 25 including the strain wave gearing mechanisms. Since the reduction gear 25 including the strain wave gearing mechanism is a reduction gear having an extremely minimal backlash and therefore the rotative force of the servo motor 26 is transmitted to the roll 13 with vibrations suppressed as much as possible, the roll 13 is stably rotated without vibrations.

Pattern control may be employed such that a longitudinal forming amount of the material 1A becomes constant while any different push-in amount in the forming area is allowed as a function of a different elastic deformation in the forming area due to different fitting of the arc-shaped die 14. For example, in the case of the die 14 fitted tightly to a flattened outer circumferential portion of the roll 13 as shown in FIG. 5 and when the material 1A is formed at a die central portion just below the key 15 causing greater depressing deformation due to lower spring constant of the die portion, the screwdown or depression may be performed in a convenient pushing pattern so as to increase the extension amount of the push-up cylinders 17 beyond $S_t$ and decrease the gap between the rolls 13 below the usual setting value $g_a$.

When a facility for producing a separator for use in a polymer electrolyte fuel cell is used which includes the uncoiler 40, the approach angle adjuster 50, the separator-forming mill 60, the pinch roll device 70, the flying shear 80 and the edge conveying guide rollers 90 as described above, the material 1A made of sheet metal to be formed can be accurately formed without deteriorated production efficiency and the highly accurate separators 1 may be efficiently manufactured.

It is to be understood that a method and a facility for producing a separator for use in a polymer electrolyte fuel cell are not limited to the above embodiment and that various changes and modifications may be made without departing from the scope of the invention.

REFERENCE SIGNS LIST 1 separator
1A material to be formed
1B coil
1a convex
1b concave
7 hydrogen passage (passage)
8 air passage (passage)
9 cooling water passage (passage)
10 housing
11 main bearing axle box
12 main bearing
13 roll
13a roll body
13b neck
13c roll shaft
14 die
14a concave
14b convex
17 push-up cylinder
17a operational signal
18 full-time play eliminating cylinder
18a operational signal
19 full-time play eliminating cylinder
19a operational signal
20 auxiliary bearing
21 non-forming-time play eliminating cylinder
21a operational signal
22 auxiliary bearing cover
23 load sensor
23a forming load
24 controller
25 reduction gear
26 servo motor
27 wave generator
29 flexspline
30 circular spline
40 uncoiler
50 approach angle adjuster
60 separator-forming mill
70 pinch roll device
80 flying shear
90 edge conveying guide roller

The invention claimed is:

1. A method for producing a separator for use in a polymer electrolyte fuel cell, comprising:
    adjusting and guiding a material to be formed, which is uncoiled by an uncoiler from a coil while controlled against meandering, in inclination angle by an approach angle adjuster into a separator-forming mill,
    introducing and pressurizing said material to be formed between a pair of rolls in said separator-forming mill, said rolls being vertically oppositely arranged to each other and each having circumferentially alternately a forming area with concaves and convexes created on a surface and a non-forming area with no concaves and convexes to continuously form a separator having passages created correspondingly to said concaves and said convexes,
    discharging and tension controlling the separator formed by said separator-forming mill by a pinch roll device with opposite widthwise ends of the separator being pinched, and
    cutting the separator discharged by the pinch roll device without stopping the same by a flying shear at portions with no passages formed.

2. A method for producing a separator for use in a polymer electrolyte fuel cell as claimed in claim 1, wherein said separator-forming mill includes
    push-up cylinders capable of adjusting a gap between said rolls,
    full-time play eliminating cylinders arranged between a housing and main bearing axle boxes for said rolls to eliminate plays in the vertical and horizontal directions, auxiliary bearings fitted to necks of said rolls, non-forming-time play eliminating cylinders arranged between said auxiliary bearings to eliminate a play between said rolls and said main bearings, and load sensors for sensing forming loads, and wherein said introducing and pressurizing said material to be formed in said separator-forming mill includes outputting operational signals to said push-up cylinders, said full-time play eliminating cylinders and said non-forming-time play eliminating cylinders, respectively, on the basis of the forming loads sensed by the load sensors to repeatedly perform the elimination of the play between the rolls and the main bearings in the non-forming area and the forming of the material in the forming area while the play between the housing and the main bearing axle boxes for the rolls is eliminated.

3. A method for producing a separator for use in a polymer electrolyte fuel cell as claimed in claim 2, wherein roll shafts of said rolls are directly coupled to separate servo motors through reduction gears including their respective strain wave gearing mechanisms and the reduction gears are directly coupled to the corresponding main bearing axle boxes.

4. A facility for producing a separator for use in a polymer electrolyte fuel cell, comprising:

an uncoiler capable of uncoiling a coil of a material to be formed while controlling the same against meandering, an approach angle adjuster capable of adjusting in inclination angle the material uncoiled from the coil by said uncoiler, a separator-forming mill with a pair of rolls vertically oppositely arranged to each other and each having circumferentially alternately a forming area with concaves and convexes created on a surface and a non-forming area with no concaves and convexes, the material adjusted in inclination angle by said approach angle adjuster being introduced and pressurized between said rolls for continuous formation of the separator having passages created correspondingly to said concaves and said convexes, a pinch roll device capable of discharging and tension controlling the separator formed by said separator-forming mill with opposite widthwise ends of the separator being pinched, and a flying shear for cutting the separator discharged by said pinch roll device at portions with no passages formed without stopping the same.

5. A facility for producing a separator for use in a polymer electrolyte fuel cell as claimed in claim 4, wherein edge conveying guide rollers for supporting opposite widthwise ends of the separator are arranged on an exit side of the separator-forming mill.

6. A facility for producing a separator for use in a polymer electrolyte fuel cell as claimed in claim 4, wherein said separator-forming mill includes push-up cylinders capable of adjusting a gap between said rolls, full-time play eliminating cylinders arranged between a housing and main bearing axle boxes for said rolls to eliminate plays in the vertical and horizontal directions, auxiliary bearings fitted to necks of said rolls, non-forming-time play eliminating cylinders arranged between said auxiliary bearings to eliminate a play between said rolls and said main bearings, load sensors for sensing forming loads, and a controller which outputs operational signals to said push-up cylinders, said full-time play eliminating cylinders and said non-forming-time play eliminating cylinders, respectively, on the basis of the forming loads sensed by the load sensors to repeatedly perform the elimination of the play between the rolls and the main bearings in the non-forming area and the forming of the material in the forming area while the play between the housing and the main bearing axle boxes for the rolls is eliminated.

7. A facility for producing a separator for use in a polymer electrolyte fuel cell as claimed in claim 6, wherein roll shafts of said rolls are directly coupled to separate servo motors through reduction gears including their respective strain wave gearing mechanisms and the reduction gears are directly coupled to the corresponding main bearing axle boxes.

* * * * *